Nov. 29, 1927.
E. J. WHITE
RESILIENT WHEEL
Filed Sept. 22, 1925
1,651,009
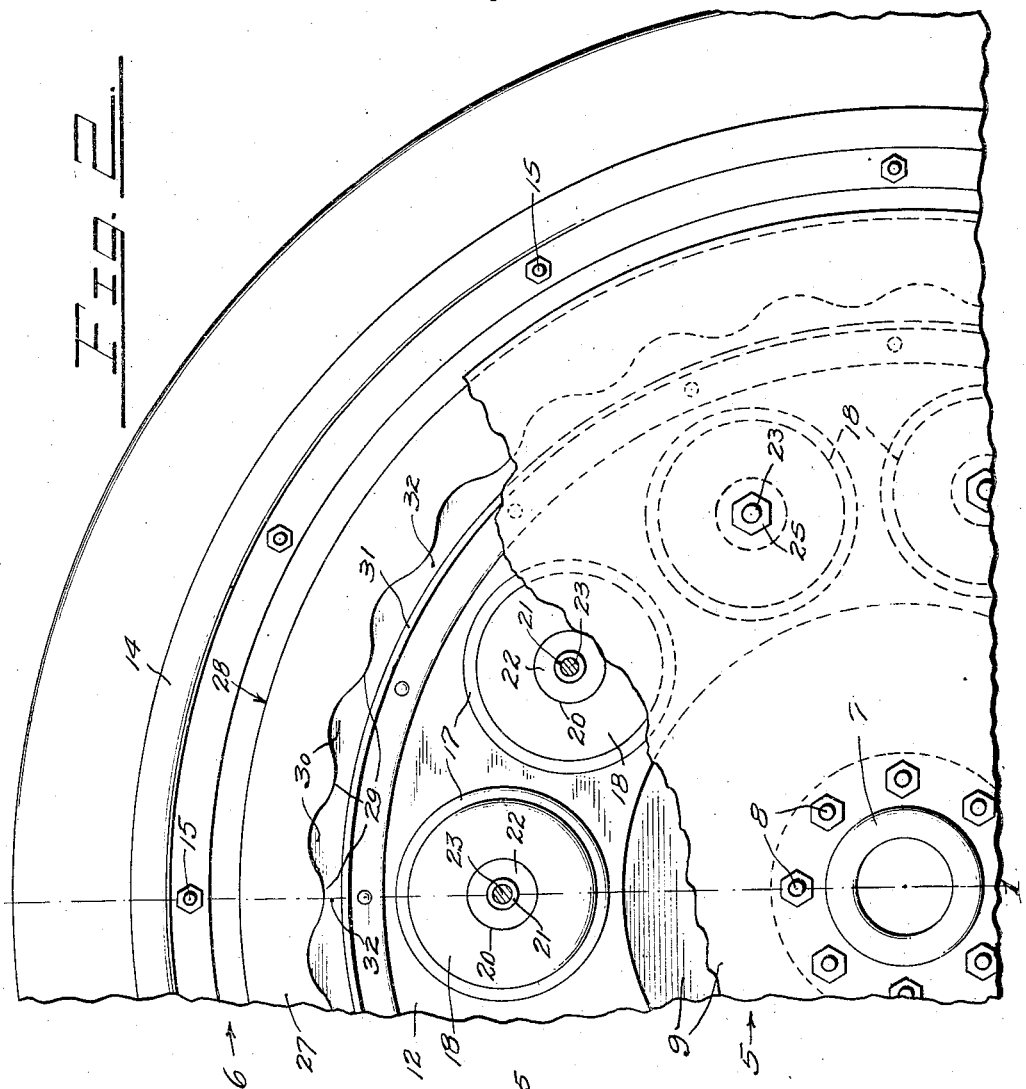
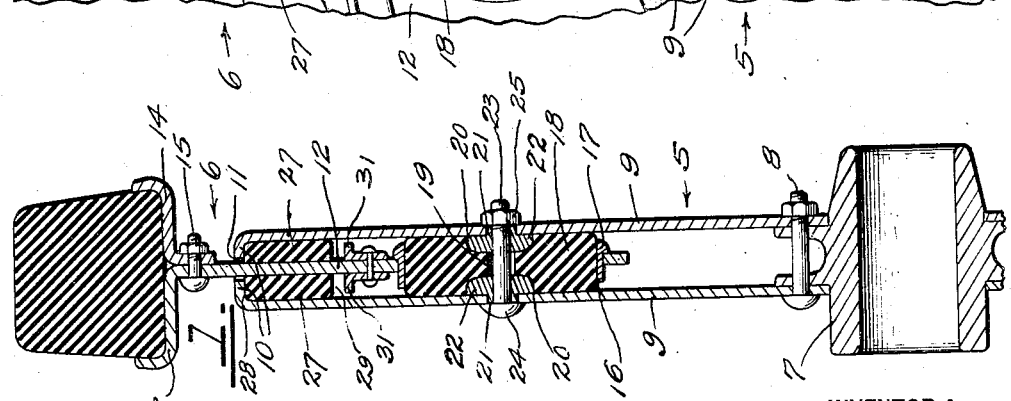
INVENTOR:
Edwin J. White
BY
ATTORNEY Patented Nov. 29, 1927.

1,651,009

UNITED STATES PATENT OFFICE.

EDWIN J. WHITE, OF SEATTLE, WASHINGTON.

RESILIENT WHEEL.

Application filed September 22, 1925. Serial No. 57,829.

This invention relates to resilient vehicle-wheels.

The object of my invention, generally, is the provision of a wheel of this character which will be of strong and durable construction and in which resilient elements are employed in a manner to overcome or neutralize road shocks under loads of different weights.

A specific object of the invention is the provision in a vehicle wheel having rigid inner and outer wheel members of novel means for yieldably keying said members together, said means serving as the resilient wheel-elements under normal loads.

Another specific object of the invention is the provision of resilient means adapted to act responsive to excessive loads and stresses and thereupon serve supplementary to the keying means above referred to to produce an easy running wheel.

Other specific objects and advantages of the invention will appear in the following specification.

The invention consists in the novel construction, adaptation and combination of devices, hereinafter described and claimed.

In the accompanying drawing,—

Figure 1 is a transverse sectional view taken substantially on line 1—1 of Fig. 2 of a portion of a wheel embodying the invention in its preferred form; and Fig. 2 is a side elevation of a portion of the wheel shown in Fig. 1. In the drawing, the reference numerals 5 and 6, respectively, represent what I term the inner and outer members of the wheel. Said inner member comprises the wheel hub 7 having rigidly secured thereto as by means of bolts 8 two spaced apart plate disks 9 having at their outer peripheries flanges 10. The flanges are directed toward each other and are of a width to afford a slot 11 therebetween.

The outer member 6 of the wheel comprises an annular plate 12 extending from the space intermediate the plate elements 9 of the inner member and through the slot 11 terminating exteriorly in a tire receiving rim.

As illustrated, said rim consists of a flange 13 integral with the plate 12 and a flanged ring 14 detachably secured to the plate by bolts 15. The plate 12 of the outer member is provided adjacent its inner periphery with a series of circular apertures 16 disposed concentrically of the longitudinal axis of the outer member. Fitted within each of the apertures and rigidly secured thereto as by welding, and constituting a part of the outer member, is a bushing 17 of a length greater than the thickness of the associated plate 12. Enclosed by each of said bushings is a disk 18 of rubber, or of a composition containing rubber, having a length approximating the distance between the plates 9 of the wheel's inner member 5.

Each rubber disk 18 is molded or otherwise formed to provide a central hole 19 and at each end a cup shaped recess 20 in axial alignment with the respective hole 19.

Positioned within each of the disk recesses and fitting the same, preferably, is a rigid body 22 having a tubular stem 21 which seats in an aperture, one for each body, provided therefor in the respective plate 9 of the inner member.

23 represents a bolt extending through holes provided in the respective bodies and rubber disks 18 and serves to couple the plates 9 with each other at the axes of the respective rubber disks.

As shown in Fig. 1, a bolt is provided at one end with a head 24 and is screw threaded at its other end to receive a nut 25 which cooperates with the bolt head 24 to prevent lateral displacement of the plates 9 opposite the various bodies 22 thereby confining the latter within the end recesses of the respective rubber disks.

From the foregoing it is to be noted that the rubber disks 18 are carried centrally of each by the bodies 22 which are positively secured by means of their stems 21 against any relative movement with respect to the inner member 5 in a plane at right angles to the wheel axis, and that the bolts and nuts, 23 and 25, serve to retain the bodies 22 within the recesses of the respective resilient disks 18.

The bodies 22, furthermore, bear endwise against the resilient disks 18 tending to prevent their becoming distorted and maintaining the same centrally of the width of the space between the plates 9 of the outer member.

The bushings 17 afford a relatively large bearing surface for the outer member 6 with respect to the outer peripheries of the resilient disks 18.

These disks constitute means for yieldingly keying the outer and inner members of the wheel with one another, permitting relative movement between such wheel members and are of strength and resiliency sufficient to accommodate normal loads of a vehicle.

To provide resiliency to the wheel under excessive loads and stresses, I provide contributory to said resilient disks a secondary resilient means which is normally inoperable.

Such secondary means, as shown, consists of two rings 27, of rubber or other suitable resilient material, each formed with a cylindrical outer surface 28 and an internal corrugated surface composed of hummocks 29 alternating with hollows 30.

The rings are located between the plates 9 and 12, one at each side of the latter, and so as to have the outer peripheries 28 of the rings bear against the inner peripheries of the respective flanges 10 of the plates 9. Interiorly of said rings the plate 12 is provided, rigid therewith at opposite sides, with circular shelf elements 31 of external diameter less than the minimum internal diameter of the rings 27 to furnish a clearance as at 32 (Fig. 2) between said shelves and the rings to permit of limited relative radial movements of the same with the respective wheel members 5 and 6 without interference or contact between the rings and the shelves.

When the radial movement of either wheel member is excessive, however, the rings 27 are brought into operable relation with said shelves to resiliently oppose the effects of the vehicle load with respect to the wheel.

It is to be noted that the hummocks of the rings 27 first encounter the shelves and as they are compressed the surfaces of the rings opposing the shelves increase to compensate for loads of different weights or power— whether static or otherwise.

While I have illustrated and described the preferred construction of my invention I do not confine myself specifically thereto except as limited by the appended claims.

What I claim, is,—

1. In a resilient wheel, in combination, a rigid member having two spaced apart apertured plate elements, a second rigid member having an apertured plate element extending into the space between the plate elements of the first named member, resilient disks extending through apertures of the plate of the second named member, said disks having recesses in the opposite ends thereof, and complementary bodies seating in the respective recesses of the disks and having stem elements adapted to engage in the respective apertures of the plate elements of the first named member, said disks serving to retain the stems of the bodies in their engaged relation with the first named member for coupling the disks thereto.

2. In a resilient wheel having a rigid member consisting of two spaced apart apertured plate elements, a second member having an apertured plate member extending into the space between the plates of the first named member, rubber bodies extending through the apertures of the second named member and having ends abutting against the inner surfaces of the plates of the first named member, the ends of said rubber bodies being recessed, centrally apertured rigid bodies provided in the recesses of the rubber bodies and having tubular stem elements extending into apertures of the plate elements of the first named member, and means extending axially through the rigid bodies and coacting with the rubber bodies for securing the plate elements of the first named member in spaced apart relation.

3. In a resilient wheel, in combination, a wheel member comprising two spaced apart plate elements rigid with the wheel hub, a second member comprising a plate member rigid with the wheel rim and extending between the plate elements of the first named member, resilient disk elements connecting said members to afford restrained relative movement between said members in the plane of the wheel, said disk elements being connected to the respective members against movement circumferentially of the wheel, and resilient means interposed between the opposite faces of the second named member and the respective inner faces of the plate elements of the first named member, said means being carried by one of said members and engaged by the other member with respect to the plane of the wheel only when a certain relative movement of the members is reached.

4. In a resilient wheel, in combination, a hollow rigid member, and a plate member extending within said hollow member, resilient elements connecting said members to afford restrained movements therebetween, and a resilient member interposed between the opposite side walls of the first named member and the opposite side faces of the plate member, said resilient member being formed and arranged to be progressively engaged only when a certain relative movement of the member is reached.

5. In a resilient wheel, in combination, a rigid member having two spaced apart plate elements, a second rigid member provided with a plurality of circumferentially spaced apertures, said second member being arranged to extend between the plates of the first named member, resilient disks positioned in the respective apertures, said disks having a recess in the opposite end of each, spaced apart disk holding means extending into the recesses of each disk, means for securing said disks from relative movement to the plates of the first named member, a resilient ring interposed between the two members, and means rigid with the respective members for operably engaging said ring only after a relative definite movement between said members is reached.

6. In a resilient wheel, a rigid member having two apertured plate elements, an apertured member extending into the space between the plate elements of the first named members, cylindrical rubber bodies extending through the apertures of the second named member, said rubber bodies having a recess in each end thereof, a plurality of rigid bodies fitting in the recesses of the respective rubber bodies and having protruding portions adapted to engage in the apertures of the plate elements of the first named members, and means coupling the plate elements of the first named member in position whereby the rubber bodies serve to engage the rigid bodies to the first named member in position to support the rubber bodies in the plane of the wheel.

Signed at Seattle, Washington, this 12th day of September, 1925.

EDWIN J. WHITE.